(12) United States Patent
Jager et al.

(10) Patent No.: US 7,259,763 B2
(45) Date of Patent: Aug. 21, 2007

(54) EMBEDDED ANALYTICS IN INFORMATION VISUALIZATION

(75) Inventors: Hayo Jager, Raleigh, NC (US);
Theodore F. Rivera, Raleigh, NC (US);
Adam Tate, Raleigh, NC (US); Scott A. Will, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 91 days.

(21) Appl. No.: 10/712,625

(22) Filed: Nov. 13, 2003

(65) Prior Publication Data

US 2005/0104885 A1 May 19, 2005

(51) Int. Cl.
*G06T 11/20* (2006.01)
(52) U.S. Cl. ...................... 345/440; 715/853
(58) Field of Classification Search ................ 345/440; 715/853–855
See application file for complete search history.

(56) References Cited

U.S. PATENT DOCUMENTS

| | | | |
|---|---|---|---|
| 5,454,068 A | | 9/1995 | Ramanujam |
| 5,572,639 A | | 11/1996 | Gantt |
| 5,572,650 A | | 11/1996 | Antis et al. |
| 5,758,026 A | * | 5/1998 | Lobley et al. ................ 706/11 |
| 5,917,500 A | | 6/1999 | Johnson et al. |
| 6,016,147 A | | 1/2000 | Gantt |
| 6,085,202 A | | 7/2000 | Rao et al. |
| 6,301,579 B1 | | 10/2001 | Becker |
| 6,323,859 B1 | | 11/2001 | Gantt |
| 6,327,586 B1 | | 12/2001 | Kisiel |
| 6,384,847 B1 | | 5/2002 | Rabenhorst |
| 6,496,832 B2 | | 12/2002 | Chi et al. |
| 6,542,909 B1 | | 4/2003 | Tamer et al. |
| 6,573,903 B2 | | 6/2003 | Gantt |
| 6,581,048 B1 | | 6/2003 | Werbos |
| 6,598,054 B2 | | 7/2003 | Schuetze et al. |
| 6,604,113 B1 | * | 8/2003 | Kenyon et al. .......... 707/104.1 |
| 6,629,090 B2 | * | 9/2003 | Tsuda et al. .................. 706/47 |
| 2003/0018652 A1 | * | 1/2003 | Heckerman et al. ..... 707/104.1 |

OTHER PUBLICATIONS

IBM Technical Disclosure Bulletin, "System Visualization Tool", R.W. McAllister and J.P. Mclellan, vol. 35, No. 3, Aug. 1992, pp. 418-419.

IBM Technical Disclosure Bulletin, "Analytical Modeling System", T. Hanschke and A. Magard, vol. 37, No. 02B, Feb. 1994, pp. 623-624.

Helmut Doleisch and Helwig Hauser, "Smooth Brushing for Focus + Context Visualization of Stimulation Data in 3D", VRVis Research Center in Vienna, Austria, http://www.VRVis.at/vis/.

* cited by examiner

*Primary Examiner*—Kee M. Tung
*Assistant Examiner*—Michelle K. Lay
(74) *Attorney, Agent, or Firm*—Andre Gibbs, Hoffman, Warnick & D'Alessandro (57) ABSTRACT

Under the present invention, a system, method, and program product for are provided for performing calculations assigned to the relationships displayed in information visualization models, and for displaying the results of the calculations. The method comprises: displaying an information visualization model having a plurality of nodes, wherein at least one node in the information visualization model is configured to: perform a calculation based on values displayed by other nodes in the information visualization model; and display a result of the calculation.

16 Claims, 9 Drawing Sheets

EMBEDDED ANALYTICS IN INFORMATION VISUALIZATION

BACKGROUND OF THE INVENTION

1. Field of the Invention

The present invention generally relates to image visualization, in which models are used to display information. More particularly, the present invention provides a method, system and program product for performing calculations assigned to the relationships displayed in those models, and for displaying the results of the calculations.

2. Related Art

Image visualization (IV) is the general field of using models to display information. A subset of this field is Focus+Context, which specializes in visualizing data in terms of relationships that remain in view while providing greater detail of the item in focus. A common example is the a hyperbolic tree, in which a selected node moves to the central focus while peripheral nodes remain in view, but off to the side. These types of models are excellent at displaying data relationships, but lack the functionality to perform calculations within those relationships.

Figure 1:
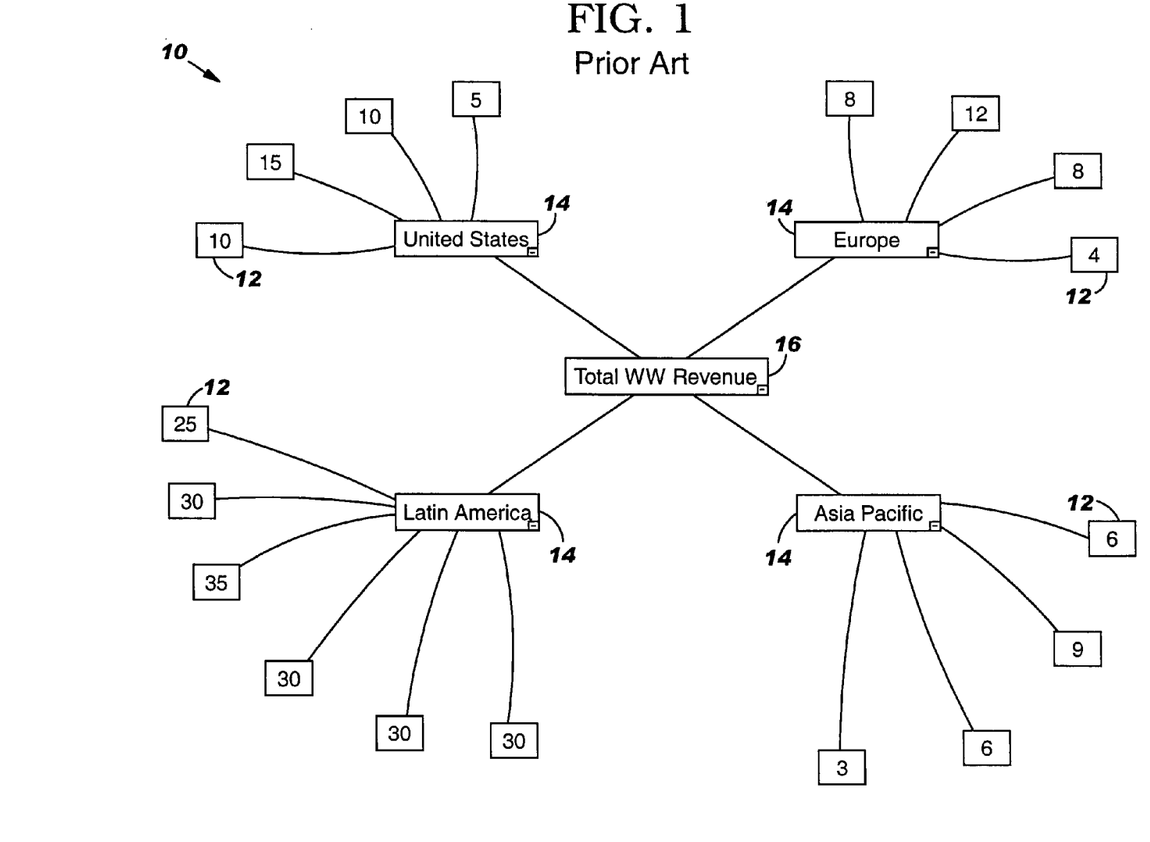
FIG. 1 depicts a prior art hyperbolic tree, wherein the Total Worldwide Revenue node is in focus.
Figure 2:
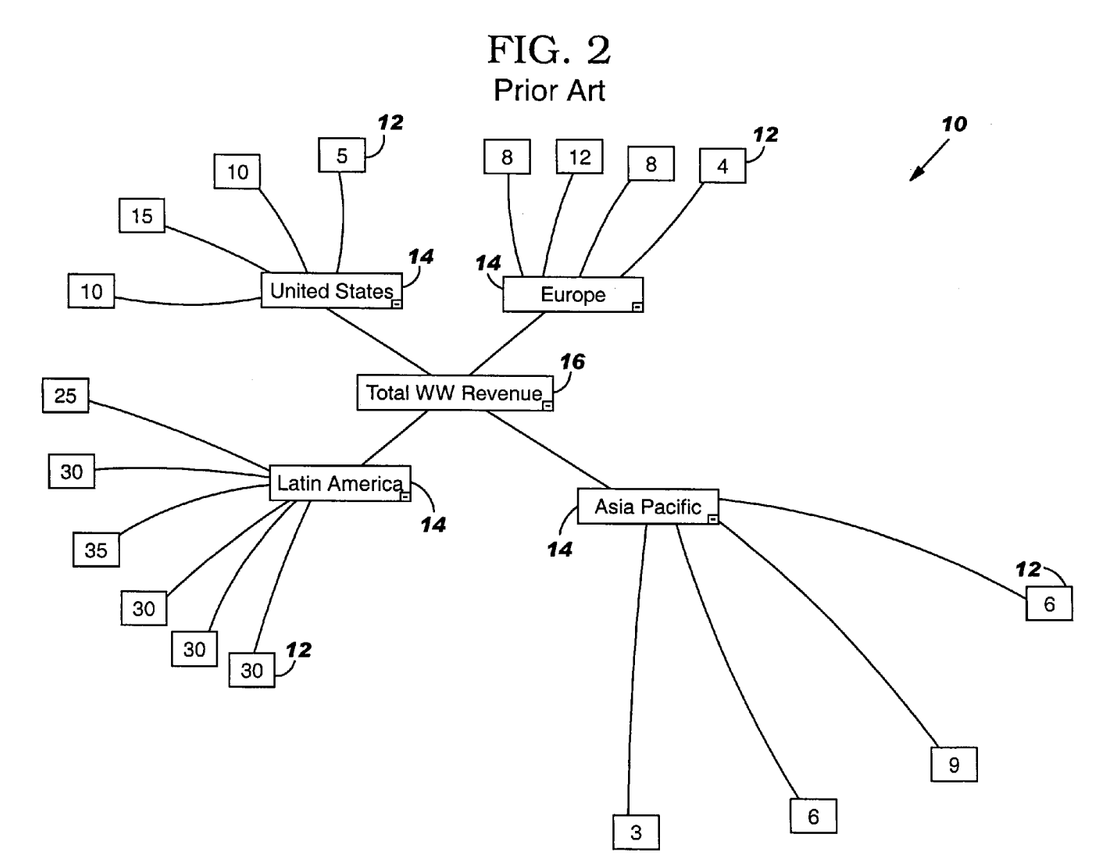
FIG. 2 depicts the prior art hyperbolic tree of FIG. 1, with the "Asia Pacific" Geography node in focus.

A simplistic example of a hyperbolic tree 10 is illustrated in FIGS. 1 and 2. In this example, the revenue data from individual Sales Region nodes 12 is displayed. Sets of the Sales Region nodes 12 are contained by respective Geography nodes 14 (i.e., United States, Europe, Latin America, and Asia Pacific), which are themselves contained by the Total Worldwide Revenue node 16. These types of relationships are easily represented in a hierarchical fashion as shown.

The relationships within the hyperbolic tree 10 are defined in terms of Degrees of Interest (DOI) that identify one node's relative position to another. The node in focus is the A Priori Interest (API). In FIG. 1, for example, the Total Worldwide Revenue node 16 is the API. Because the Total Worldwide Revenue node 16 is the API, it is displayed in the center of the hyperbolic tree 10, with the Geography nodes 14 located outside of the Total Worldwide Revenue node 16, and the Sales Region nodes 12 located outside of the Geography nodes 14. In this example, each Geography node 14 has a Degree of Interest that is one level less (DOI: n−1) than the Total Worldwide Revenue node 16 (i.e., the node in focus). Similarly, each Sales Region node 12 has a Degree of Interest that is two levels less (DOI: n−2) than the Total Worldwide Revenue node 16. Further, each Sales Region node 12 has a Degree of Interest that is one level less (DOI: n−1) than its respective Geography node 14. The Total Worldwide Revenue node 16 can thus be considered the "parent" node, while the Geography nodes 14 can be considered to be "children" of the Total Worldwide Revenue node 16, and the Sales Region nodes 12 can be considered to be the "children" of specific Geography nodes 14 and "grandchildren" of the Total Worldwide Revenue node 16.

Referring now to FIG. 2, the hyperbolic tree 10 has been transformed in response to the activation of the "Asia Pacific" Geography node 14. In particular, the Geography node 14 "Asia Pacific" is now the API, located in the center of the hyperbolic tree 10. Typically, a node is activated by clicking on the node using a mouse pointer or the like. Other activation techniques are also possible. As can be seen in FIG. 2, the Total Worldwide Revenue node 16, as well as the remaining Geography nodes 14 (i.e., United States, Europe, and Latin America) and their respective Sales Region nodes 12 remain in view, but off to the side of the "Asia Pacific" Geography node 14.

While currently available IV models, such as the hyperbolic tree 10 shown in FIGS. 1 and 2, are adequate at communicating hierarchical relationships between data, the IV models are not capable of analyzing the data within the context of those relationships. As such, there exists a need for an IV model that is capable of analyzing the data within the context of the relationships displayed by the model, and which is capable of displaying the results of the data analysis.

SUMMARY OF THE INVENTION

In general, the present invention provides a method, system, and program product for performing calculations assigned to the relationships displayed in information visualization (IV) models, and for displaying the results of the calculations A first aspect of the present invention is directed to an image visualization method comprising: displaying an information visualization model having a plurality of nodes, wherein at least one node in the information visualization model is configured to perform a calculation based on values displayed by other nodes in the information visualization model, and to display a result of the calculation.

A second aspect of the present invention is directed to a image visualization system, comprising: a system for displaying an information visualization model having a plurality of nodes, wherein at least one node in the information visualization model comprises a system for: performing a calculation based on values displayed by other nodes in the information visualization model; and displaying a result of the calculation.

A third aspect of the present invention is directed to a program product stored on a recordable medium, which when executed, comprises: program code for displaying an information visualization model having a plurality of nodes, wherein at least one node in the information visualization model is configured to perform a calculation based on values displayed by other nodes in the information visualization model, and to display a result of the calculation.

Therefore, the present invention provides a method, system and program product for performing calculations assigned to the relationships displayed in information visualization (IV) models, and for displaying the results of the calculations.

BRIEF DESCRIPTION OF THE DRAWINGS

These and other features of this invention will be more readily understood from the following detailed description of the various aspects of the invention taken in conjunction with the accompanying drawings in which.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a method, system, and program product for performing calculations assigned to the relationships displayed in information visualization (IV) models, and for displaying the results of the calculations. In addition, the calculations could be assigned to the dynamic relationships created by predefined user action.

The present invention is described in terms of calculations and analytics that are based on hierarchical relationships within an IV model. Although described below with regard to a hyperbolic tree IV model, it should be clear that the present invention may be applied to other now known or later developed IV models without departing from the intended scope of the present invention as defined in the claims. Such IV models may include, but are not limited to, VENN diagrams, Organization charts, etc.

Figure 3:
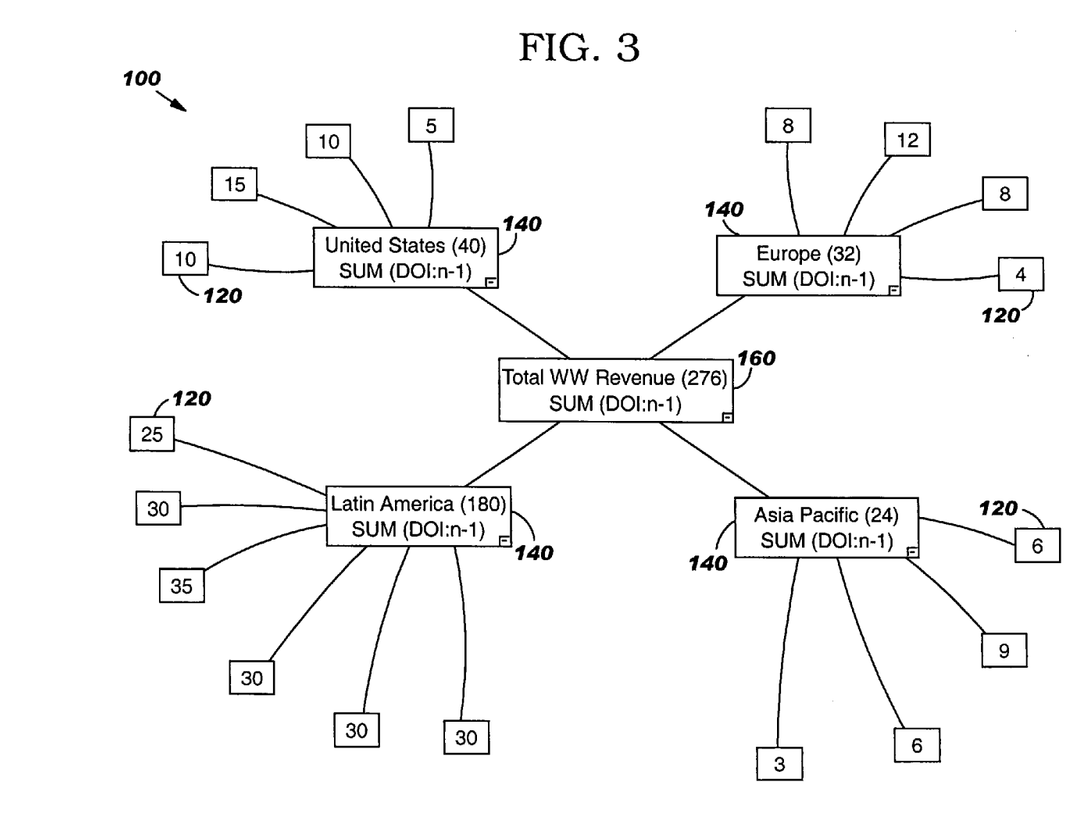
FIG. 3 depicts a hyperbolic tree in accordance with the present invention, wherein the Total Worldwide Revenue node is in focus, wherein the Total Worldwide Revenue node calculates and displays the sum of the values displayed by the Geography nodes, and wherein each Geography node calculates and displays the sum of the values displayed by its respective Sales Region nodes.

Referring now to FIG. 3, there is illustrated an example of a Focus+Context hyperbolic tree 100 in accordance with the present invention. Similar to the hyperbolic tree 10 shown in FIG. 1, the hyperbolic tree 100 displays the revenue data from individual Sales Region nodes 120. Sets of the Sale Region nodes 120 are contained by respective Geography nodes 140 (i.e., United States, Europe, Latin America, and Asia Pacific), which are themselves contained by the Total Worldwide Revenue node 160. Unlike the hyperbolic tree 10 shown in FIG. 1, however, the hyperbolic tree 100 in accordance with the present invention performs calculations assigned to the relationships displayed in the hyperbolic tree 100, and displays the results of the calculations.

In FIG. 3, the Total Worldwide Revenue node 160 is the API. As such, the Total Worldwide Revenue node 160 is displayed in the center of the hyperbolic tree 100, with the Geography nodes 140 located outside of the Total Worldwide Revenue node 160, and the Sales Region nodes 120 located outside of the Geography nodes 140. In this example, each Geography node 140 has a Degree of Interest that is one level less (DOI: n−1) than the Total Worldwide Revenue node 160 (i.e., the node in focus). Similarly, each Sales Region node 120 has a Degree of Interest that is two levels less (DOI: n−2) than the Total Worldwide Revenue node 160. Further, each Sales Region node 120 has a Degree of Interest that is one level less (DOI: n−1) than its respective Geography node 140. The Total Worldwide Revenue node 160 can thus be considered the "parent" node, while the Geography nodes 140 can be considered to be "children" of the Total Worldwide Revenue node 160, and the Sales Region nodes 120 can be considered to be the "children" of specific Geography nodes 140 and "grandchildren" of the Total Worldwide Revenue node 160.

In accordance with the present invention, the hyperbolic tree 100 performs calculations assigned to displayed relationships, and displays the results of the calculations. Specifically, in the hyperbolic tree 100 illustrated in FIG. 3, each Geography node 140 is configured to sum the values displayed by each associated Sales Region node 120. This is represented in each Geography node 140 as "SUM (DOI: n−1)." For example, referring to the "Asia Pacific" Geography node 140, the sum of the Sales Region nodes 120 connected to the "Asia Pacific" Geography node 140 is equal to 24 (i.e., 3+6+9+6). This calculated value is displayed as part of the "Asia Pacific" Geography node 140. In a similar fashion, the sum of the Sales Region nodes 120 connected to the "Latin America," "United States," and "Europe" Geography nodes 140 is equal to 180 (i.e., 25+30+35+30+30+30), 40 (i.e., 10+15+10+5), and 32 (i.e., 8+12+8+4), respectively. Thus, each Geography node 140 calculates an displays the sum of the values displayed by its children (i.e., the Sales Region nodes 120 connected to the Geography node 140 ).

The Total Worldwide Revenue node 160 illustrated in FIG. 3 is configured to sum the values displayed by each of the plurality of Geography nodes 140. This is represented in the Total Worldwide Revenue node 160 as "SUM (DOI: n−1)." In this example, the sum of the Geography nodes 140 connected to the Total Worldwide Revenue node 160 is equal to 276 (i.e., 24+180+40+32). This calculated value is displayed as part of the Total Worldwide Revenue node 160. Thus, similar to each Geography node 140, the Total Worldwide Revenue node 160 calculates and displays the sum of the values displayed by its children (i.e., the Geography nodes 140 connected to the Total Worldwide Revenue node 160 ).

Figure 4:
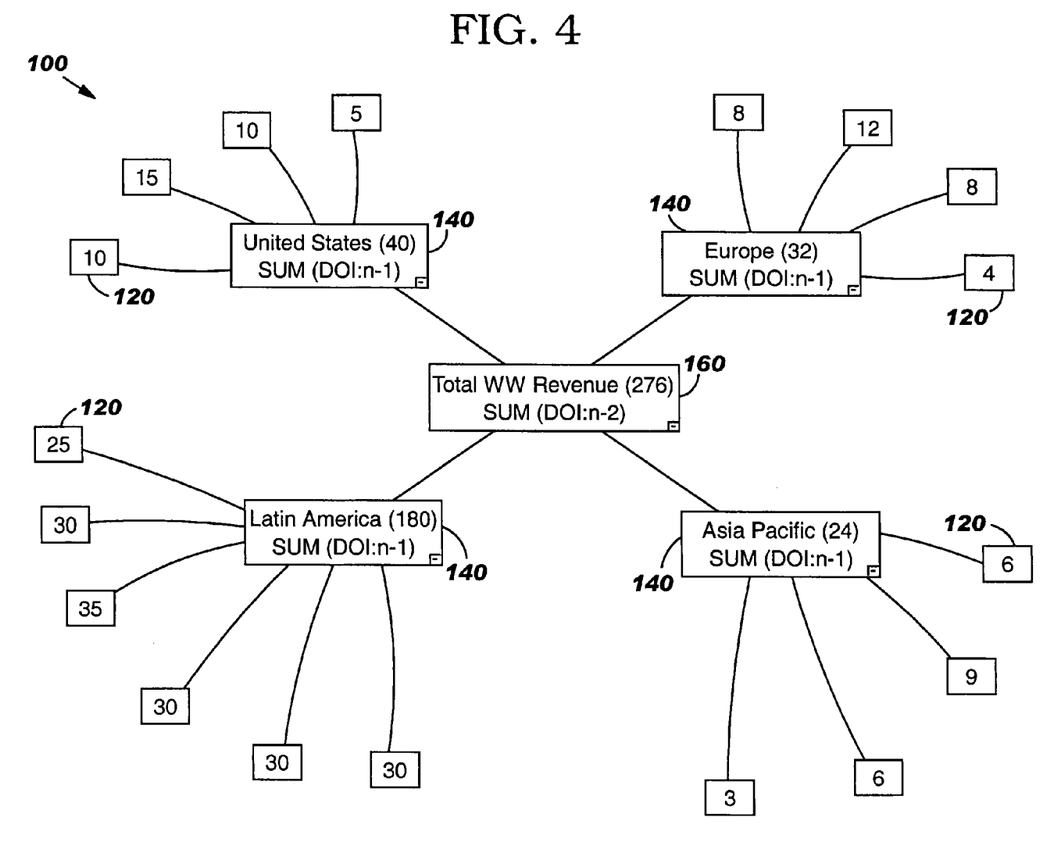
FIG. 4 depicts a hyperbolic tree in accordance with the present invention, wherein the Total Worldwide Revenue node is in focus, wherein the Total Worldwide Revenue node calculates and displays the sum of the values displayed by the Sales Region nodes, and wherein each Geography node calculates and displays the sum of the values displayed by its respective Sales Region nodes.

In FIG. 3, the Total Worldwide Revenue node 160 was configured to sum the values displayed by each of its children (i.e., the plurality of Geography nodes 140 ). It should be noted, however, as shown in FIG. 4, that the Total Worldwide Revenue node 160 may also be configured to directly sum the values displayed by each of its grandchildren (i.e., the plurality of Sales Region nodes 120 ). This is represented in FIG. 4 as "SUM (DOI: n−2)." In this case, the Total Worldwide Revenue node 160 again displays the value 276.

Comparing FIGS. 3 and 4, it should be noted that the ultimate result of the calculations, that is, the value displayed by the Total Worldwide Revenue node 160, is the same for both examples, irrespective of the different DOI values of the inputs. In other words, if you sum the plurality of Geography nodes 140 (FIG. 3), and directly sum the plurality of Sales Region nodes 120 separately (FIG. 4), the calculated value displayed in the Total Worldwide Revenue node 160 is the same. This is due to the associative property of the sum calculation.

The calculations performed by the various nodes in the hyperbolic tree 100 may be applied to values displayed by children nodes (DOI: n−1), grandchildren nodes (DOI: n−2), great-grandchildren nodes (DOI: n−3), etc., or combinations thereof. In addition, as will be described below, each node is not required to perform the same type of calculation (i.e., SUM). Calculations such as average, standard deviation, multiplication, subtraction, etc., may also be performed. Further, as detailed below, a node may be configured to perform different calculations, depending on its current displayed location within the hyperbolic tree 100 (e.g., in focus or out of focus).

Figure 5:
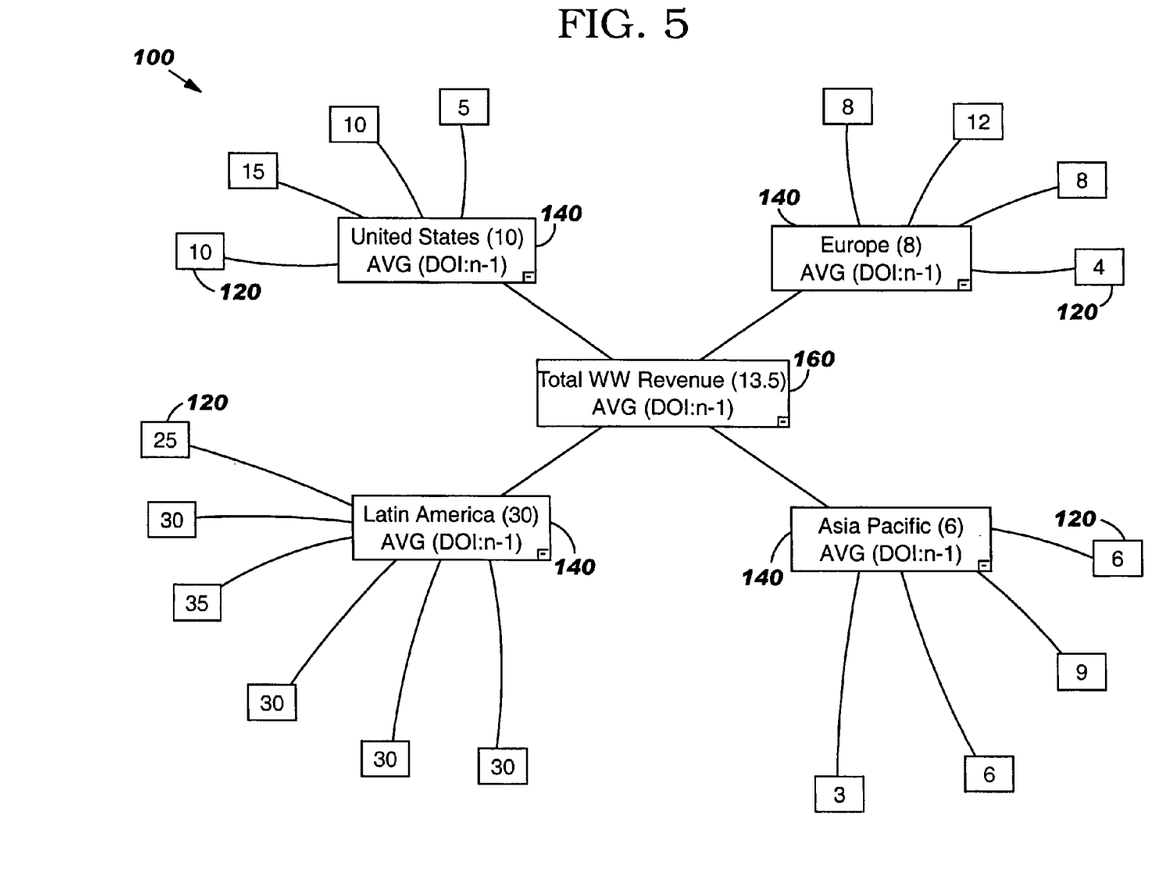
FIG. 5 depicts a hyperbolic tree in accordance with the present invention, wherein the Total Worldwide Revenue node is in focus, wherein each Geography node calculates and displays the average of the values displayed by its respective Sales Region nodes, and wherein the Total Worldwide Revenue node calculates and displays the average of the values displayed by the Geography nodes.

Referring now to FIG. 5, each Geography node 140 is configured to average the values displayed by its respective Sales Region nodes 120. This is represented in each Geography node 140 as "AVG (DOI: n−1)." For example, in FIG. 5, the "Asia Pacific" Geography node 140 displays a value of 6, which is the average of the values displayed by its respective Sales Region nodes 120 (i.e., (3+6+9+6)/4). Similarly, the Total Worldwide Revenue node 160 is configured to average the values displayed by each the plurality of Geography nodes 140. This is represented in the Total Worldwide Revenue node 160 as "AVG (DOI: n−1)." In this example, the average of the Geography Region nodes 140 connected to the Total Worldwide Revenue node 160 is equal to 13.5 (i.e., (6+30+10+8)/4). This calculat value is displayed as part of the Total Worldwide Revenue node 160. It should be noted that in FIG. 5, the value calculated by the Total Worldwide Revenue node 160 is an average of an average, which may be useful in some contexts, but in others may lead to the mathematical pitfall of averaging averages.

Figure 6:
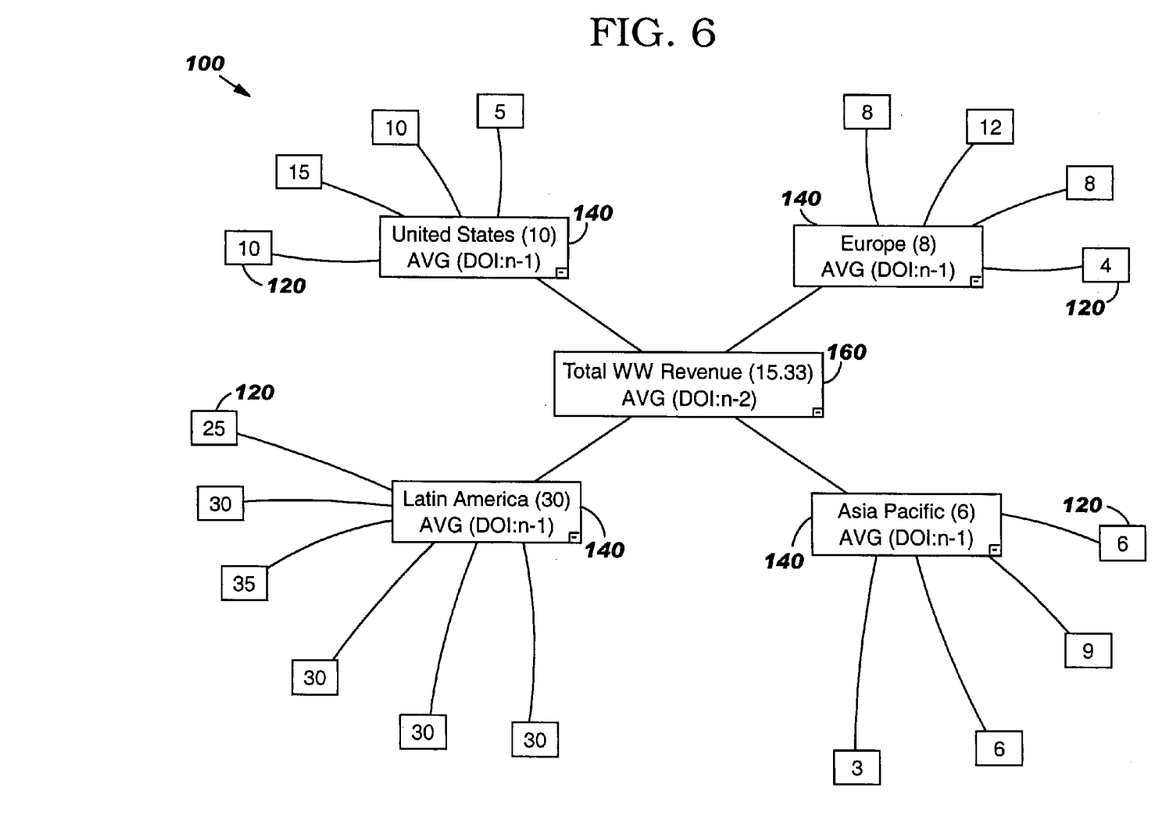
FIG. 6 depicts a hyperbolic tree in accordance with the present invention, wherein the Total Worldwide Revenue node is in focus, wherein the Total Worldwide Revenue node calculates and displays the average of the values displayed by the Sales Region nodes, and wherein each Geography node calculates and displays the average of the values displayed by its respective Sales Region nodes.

The hyperbolic tree 100 illustrated in FIG. 6 obviates the problems associated with averaging averages. In particular, the Total Worldwide Revenue node 160 is configured to provide a comprehensive average by directly averaging the values displayed by each the plurality of Sales Region nodes 120. This is represented in the Total Worldwide Revenue node 160 as "AVG (DOI: n−2)." In this example, the average of the Sales Region nodes 120 is equal to 15.33 (i.e.,(3+6+9+6+25+30+35+30+30+30+10+15+10+5+8+12+8+4)/18). As in FIG. 5, each Geography node 140 is configured to average the values displayed by its respective Sales Region nodes 120. This is,represented in each Geography node 140 as "AVG (DOI: n−1)." For example, in FIG. 6, the "Asia Pacific" Geography node 140 displays a value of 6, which is the average of the values displayed by its respective Sales Region nodes 120 (i.e., (3+6+9+6)/4).

Figure 7:
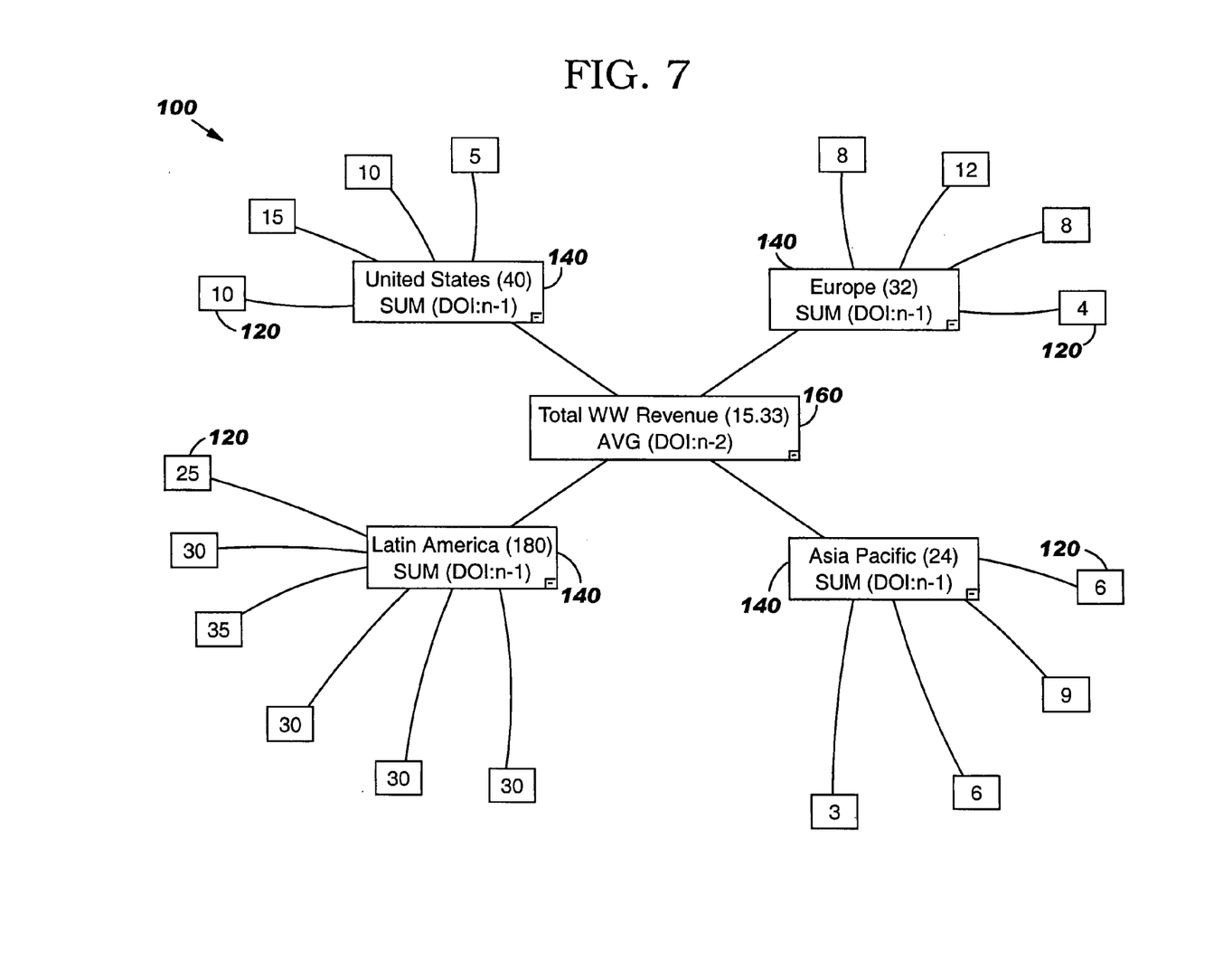
FIG. 7 depicts a hyperbolic tree in accordance with the present invention, wherein the Total Worldwide Revenue node is in focus, wherein the Total Worldwide Revenue node calculates and displays the average of the values displayed by the Sales Region nodes, and wherein each Geography node calculates and displays the sum of the values displayed by its respective Sales Region nodes.

An example of a hyperbolic tree 100 wherein different types of calculations are performed in different nodes is illustrated in FIG. 7. In this example, the Total Worldwide Revenue node 160 is configured to provide a comprehensive average by directly averaging the values displayed by each the plurality of Sales Region nodes 120. This is represented in the Total Worldwide Revenue node 160 as "AVG (DOI: n−2)." Each Geography node 140, however, is configured to perform a SUM calculation of its respective Sales Region nodes 120. This is represented in each Geography node 140 as "SUM (DOI: n−1)."

Figure 8:
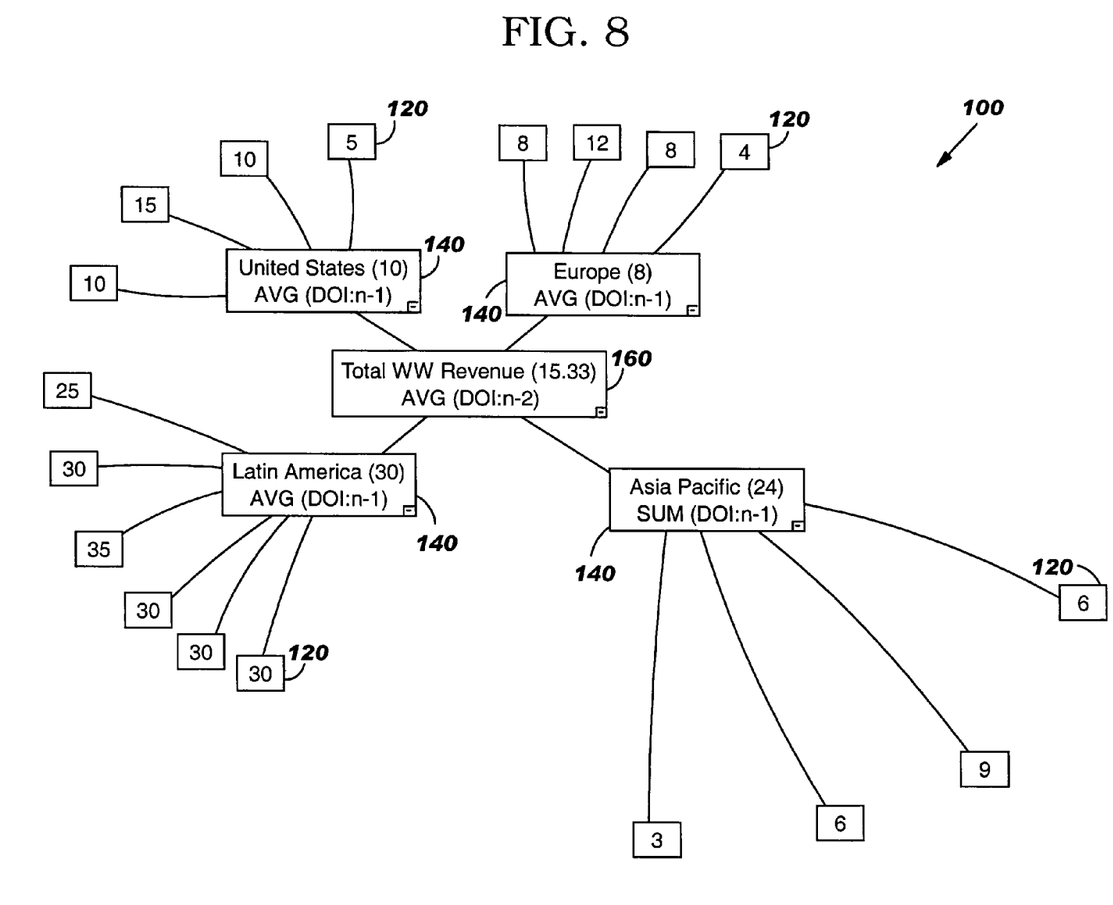
FIG. 8 depicts a hyperbolic tree in accordance with the present invention, wherein the "Asia Pacific" Geography node is in focus, and wherein the calculation performed by the "Asia Pacific" Geography node changed from average to sum when the "Asia Pacific" Geography node moved into focus.

Another example of a hyperbolic tree 100 in accordance with the present invention is illustrated in FIG. 8. In this example, node calculations are assigned to the dynamic relationships created by predefined user action. In particular, in FIG. 8, the "Asia Pacific" Geography node 140 has been selected by a user and has been moved to the center of the picture (i.e., the "Asia Pacific" Geography node 140 is now in focus). Prior to being selected, as shown in FIG. 6, the "Asia Pacific" Geography node 140 calculated and displayed the average of its respective Sales Region nodes 120. This is represented in FIG. 6 as "AVG (DOI: n−1)." After being selected, however, as shown in FIG. 8, the "Asia Pacific" Geography node 140 moved into focus and the calculation performed on its respective Sales Region nodes 120 changed from average to sum. Thus, in response to its selection, the average calculation (i.e., AVG (DOI: n−1)) performed by the "Asia Pacific" Geography node 140 was superseded by a sum calculation (i.e., SUM (DOI: n−1)).

In the example shown in FIG. 8, calculations are based on the API or focus of the IV model. Thus, the calculations are not contained by the nodes themselves, but by the model structure. With regard to FIG. 8, for example, the calculation performed by the "Asia Pacific" Geography node 140 is set to AVG when this node is not in focus. The SUM calculation is assigned to the relative position of API that overrides the AVG node calculation as the "Asia Pacific" Geography node 140 is brought into focus.

The calculations performed by nodes located one or more DOI levels subsequent to the API could also change in response to a node moving to the API. For example, when the Worldwide Revenue node 160 is the API, not only is its calculation reset to "SUM," but the calculations of the Geography nodes 140 could change to "SUM" as well.

The Total Worldwide Revenue node 160 and the plurality of Geography nodes 140 each perform a calculation that is specified in the node property fields of the nodes. Examples of the node property fields are described in detail below. In general, the node property fields specify the following, when calculations are based on static relationships (e.g., as shown in FIGS. 3-7):

Input: the DOI level to use as inputs.

Function: the calculation to be applied to the inputs (e.g., SUM, AVG).

Output: The result of the function.

When calculations are based on dynamic relationships created by a predefined user action (e.g., as shown in FIG. 8), the node property fields specify the following:

Input: the maximum DOI level away from the API to use as inputs.

Function: the calculation to be applied to the inputs (e.g., SUM, AVG).

Output: The result of the function to be displayed at the API.

TABLE 1 presents exemplary node property fields associated with the Total Worldwide Revenue node 160 illustrated in FIGS. 3 and 6.

TABLE 1

| FIELDS | DESCRIPTION | SAMPLE VALUE | RESULT |
|---|---|---|---|
| Text | Defines text contained in node title | Total WW Revenue | The words "Total WW Revenue" are displayed within the node |
| NodeColor | Defines color of node | Green | Node containing "Total WW Revenue" is green |
| NodeTextColor | Defines color of text in node | Black | "Total WW Revenue" text is black |
| Parent | Describes parent of node | <none> | Node has no parent |
| Child | Describes child nodes (n − 1) of node | United States, Europe, Latin America, Asia Pacific | Links established and displayed |
| Grandchild | Describes grandchild nodes (n − 2) of node | 10, 15, 10, 5, 8, 12, 8, 4, 6, 9, 6, 3, 30, 30, 30, 35, 30, 25 | Used for orientation and display only |
| NodeValue | Defines value point of node if not calculated | <none> | No inherent value to node |
| (n − 1) Calculation | Defines formula applied to child (n − 1) nodes | SUM (FIG. 3); <none> (FIG. 6) | Sum (FIG. 3), no calculation (FIG. 6), of values in child (n − 1) nodes is displayed. |
| (n − 2) Calculation | Defines formula applied to grandchild (n − 2) nodes | <none> (FIG. 3); AVG (FIG. 6) | No calculation (FIG. 3), average (FIG. 6), of values in grandchild (n − 2) nodes is displayed |
| API Calculation | Defines formula applied to child (n − 1) nodes when brought into focus that overrides default (n − 1) calculation above | <none> | Result of formula displayed does not change when node is brought into API |

The first three rows in TABLE 1 (Text, NodeColor, and NodeTextColor) define the appearance of the Total Worldwide Revenue node 160. The next three rows (Parent, Child, Grandchild) define the position and family relationships of the Total Worldwide Revenue node 160. The next four rows (NodeValue, (n–1) Calculation, (n–2) Calculation, API Calculation) define the calculated/fixed value that is displayed by the Total Worldwide Revenue node 160.

TABLE 2 presents exemplary node property fields associated with the "Asia Pacific" Geography node 140 illustrated in FIGS. 6 and 8.

TABLE 2

| FIELDS | DESCRIPTION | SAMPLE VALUE | RESULT |
|---|---|---|---|
| Text | Defines text contained in node title | Asia Pacific | The words "Asia Pacific" are displayed within the node |
| NodeColor | Defines color of node | Olive | Node containing "Asia Pacific" is olive |
| NodeTextColor | Defines color of text in node | Dark Brown | "Asia Pacific" text is dark brown |
| Parent | Describes parent of node | Total WW Revenue | Links established and displayed |
| Child | Describes child nodes (n − 1) of node | 6, 9, 6, 3 | Links established and displayed |
| Grandchild | Describes grandchild nodes (n − 2) of node | <none> | Node has no grandchild nodes |
| NodeValue | Defines value point of node if not calculated | <none> | No inherent value to node |
| (n − 1) Calculation | Defines formula applied to child (n − 1) nodes | AVG | Average of values in child (n − 1) nodes is displayed. |
| (n − 2) Calculation | Defines formula applied to grandchild (n − 2) nodes | <none> | No calculation |
| API Calculation | Defines formula applied to child (n − 1) nodes when brought into focus that overrides default (n − 1) calculation above | SUM | Result of formula displayed changes from average to sum when node is brought into API |

Referring to the last row in TABLE 2, it can be seen that the calculation performed by the "Asia Pacific" Geography node 140 changes from average to sum when this node becomes the API. This can be seen by comparing FIGS. 6 and 8.

TABLE 3 presents exemplary node property fields associated with one of the child nodes (i.e., Sales Region nodes 120) associated with the "Asia Pacific" Geography node 140.

TABLE 3

| FIELDS | DESCRIPTION | SAMPLE VALUE | RESULT |
| --- | --- | --- | --- |
| Text | Defines text contained in node title | <none> | Defaults to Node Value |
| NodeColor | Defines color of node | Yellow | Node containing "9" is yellow |
| NodeTextColor | Defines color of text in node | Black | Text is black |
| Parent | Describes parent of node | Asia Pacific | Links established and displayed |
| Child | Describes child nodes (n − 1) of node | <none> | Links established and displayed |
| Grandchild | Describes grandchild nodes (n − 2) of node | <none> | Node has no grandchild nodes |
| NodeValue | Defines value point of node if not calculated | 9 | Node has value 9 |

Figure 9:
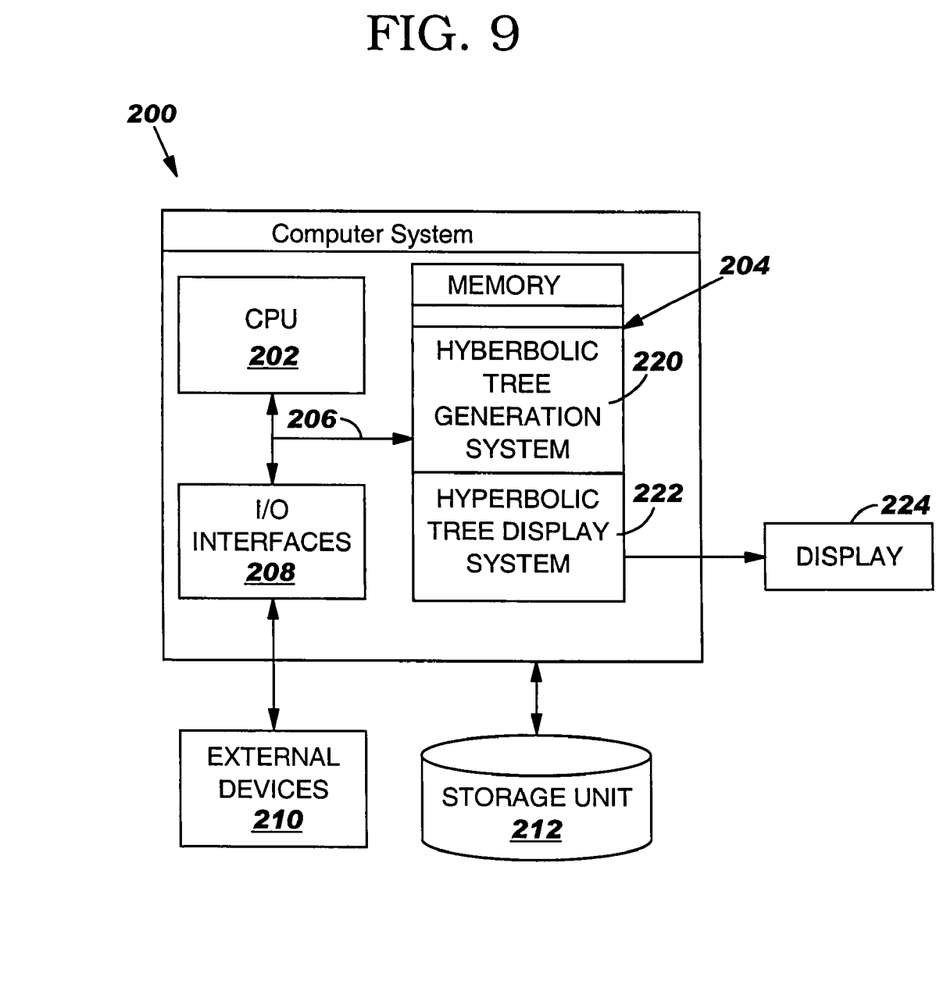
FIG. 9 illustrates a computer system 200 for implementing the hyperbolic tree in accordance with the present invention.

Referring now to FIG. 9, a computer system 200 for implementing the hyperbolic tree 100 in accordance with the present invention is shown. In general, the hyperbolic tree 100 could be implemented on any computerized system capable of carrying out the functions of the present invention described herein. For example, the computerized system could be a personal computer, a workstation, a server, a laptop, a handheld device, etc.

As shown, computer system 200 generally comprises central processing unit (CPU) 202, memory 204, bus 206, input/output (I/O) interfaces 208, external devices/resources 210 and storage unit 212. CPU 202 may comprise a single processing unit, or may be distributed across one or more processing units in one or more locations. Memory 204 may comprise any known type of data storage and/or transmission media, including magnetic media, optical media, random access memory (RAM), read-only memory (ROM), a data cache, a data object, etc. Moreover, similar to CPU 202, memory 204 may reside at a single physical location, comprising one or more types of data storage, or may be distributed across a plurality of physical systems in various forms.

I/O interfaces 208 may comprise any system for exchanging information to/from an external source. External devices/resources 210 may comprise any known type of external device, including speakers, a CRT, LCD screen, handheld device, keyboard, mouse, voice recognition system, speech output system, printer, monitor/display, facsimile, pager, etc. Bus 206 provides a communication link between each of the components in computer system 200 and likewise may comprise any known type of transmission link, including electrical, optical, wireless, etc.

Storage unit 212 can be any system capable of providing storage for information, such as the node property fields (see, e.g., TABLES 1-3) for implementing hyperbolic tree 100, under the present invention. As such, storage unit 212 may reside at a single physical location, comprising one or more types of data storage, or may be distributed across a plurality of physical systems in various forms. In another embodiment, storage unit 212 may be distributed across, for example, a local area network (LAN), wide area network (WAN) or a storage area network (SAN) (not shown).

Shown in memory 204 of computer system 200 is hyperbolic tree generation system 220 and hyperbolic tree display system 222, which may be provided as computer program products. Hyperbolic tree generation system 220 is provided to generate hyperbolic tree 100 based on its associated node property fields, which are stored in storage unit 212. Hyperbolic tree generation system 220 generates the nodes and establishes the links/relationships of the hyperbolic tree 100, and performs all necessary calculations set forth in the node property fields corresponding to the hyperbolic tree 100. Hyperbolic tree display system 222 displays the resultant hyperbolic tree 100 on a display 224.

It should be understood that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible.

Such modifications and variations that may be apparent to a person skilled in the art are intended to be included within the scope of this invention as defined by the accompanying claims.

We claim:

1. An image visualization method, comprising:
    displaying a Focus+Content information visualization model having a plurality of nodes, wherein at least one node in the in the information visualization model is configured to:
    perform a calculation based on values displayed by other nodes in the information visualization model, wherein a first mathematical operation is performed when a node is in focus, and wherein a second, different mathematical operation is performed in the non-focus node; and
    display a result of the calculation.

2. The method of claim 1, wherein the value displayed by each of the other nodes in the information model is provided by either:
    assigning a value to the node; or
    performing a calculation based on values displayed by other nodes in the information visualization model.

3. The method of claim 1, wherein the calculation is performed using values displayed by other nodes in the information visualization model having a Degree of Interest (DOI) level that is less than the at least one node.

4. The method of claim 1, wherein the Focus+Context model comprises a hyperbolic tree.

5. The method of claim 1, wherein the at least one node performs the calculation using values displayed by its child nodes.

6. The method of claim 1, wherein the at least one node performs the calculation using values displayed by its grandchild nodes.

7. The method of claim 1, wherein the calculation performed by each of the at least one node is dependent upon a relative position of the node in the information visualization model.

8. An image visualization system, comprising:
    a system for displaying a Focus+Content information visualization model having a plurality of nodes, wherein at least one node in the information visualization model comprises a system for:
    performing a calculation based on values displayed by other nodes in the information visualization model, wherein a first mathematical operation is performed when a node is in focus, and wherein a second, different mathematical operation is performed in the non-focus node; and
    display a result of the calculation.

9. The system of claim 8, wherein the value displayed by each of the other nodes in the information model is provided by a system configured to either:
    assign a value to the node; or
    perform a calculation based on values displayed by other nodes in the information visualization model.

10. The system of claim 8, wherein the calculation is performed using values displayed by other nodes in the information visualization model having a Degree of Interest (DOI) level that is less than the at least one node.

11. The system of claim 8, wherein the Focus+Context model comprises a hyperbolic tree.

12. The system of claim 8, wherein the calculation performed by each of the at least one node is dependent upon a relative position of the node in the information visualization model.

13. A recordable medium comprising a program product, which when executed, comprises:
    program code for displaying a Focus+Content information visualization model having a plurality of nodes, wherein at least one node in the information visualization model is configured to perform a perform a calculation based on values displayed by other nodes in the information visualization model, wherein a first mathematical operation is performed when a node is in focus, and wherein a second, different mathematical operation is performed in the non-focus node; and
    display a result of the calculation.

14. The program product of claim 13, wherein the value displayed by each of the other nodes in the information model is provided by program code for either:
    assigning a value to the node; or
    performing a calculation based on values displayed by other nodes in the information visualization model.

15. The program product of claim 13, further comprising program code for performing the calculation using values displayed by other nodes in the information visualization model having a Degree of Interest (DOI) level that is less than the at least one node.

16. The program product of claim 13, wherein the calculation performed by each of the at least one node is dependent upon a relative position of the node in the information visualization model.

* * * * *